June 5, 1956 R. J. KLEIN, JR 2,749,481
STROBOSCOPE
Filed Sept. 9, 1954
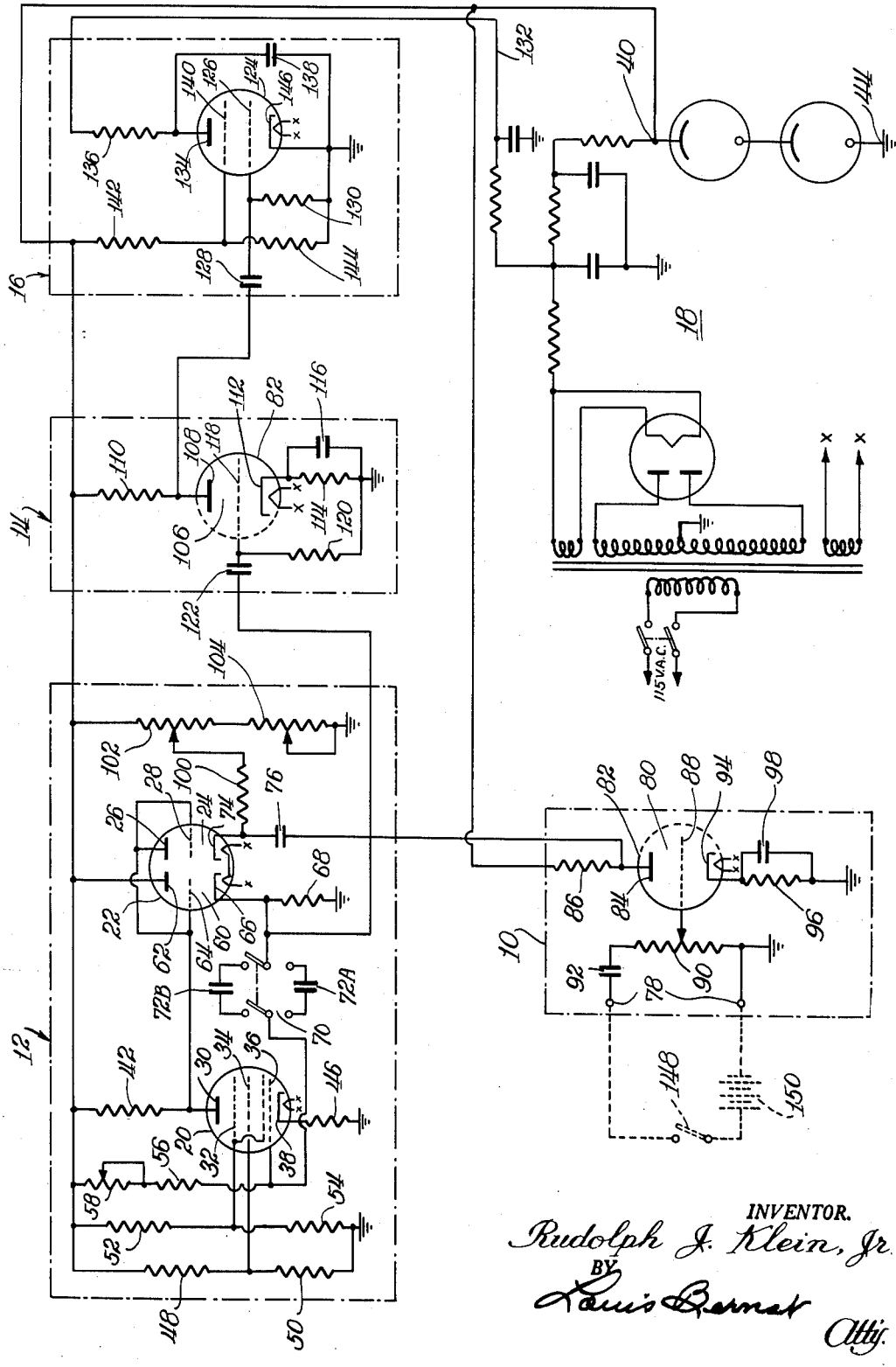
INVENTOR.
Rudolph J. Klein, Jr.
BY
Louis Barnet
Atty.

United States Patent Office 2,749,481
Patented June 5, 1956

2,749,481

STROBOSCOPE

Rudolph J. Klein, Jr., Oak Ridge, Tenn., assignor to Phillips Control Corporation, a corporation of Illinois Application September 9, 1954, Serial No. 454,953

8 Claims. (Cl. 315—205)

The present invention relates to devices for investigating the motions of mechanisms, particularly mechanisms with periodic motions.

Conventional stroboscopes produce a flash of light periodically which may be directed upon the mechanism under investigation. The frequency of the light flash is generally adjustable, so that the light flash may be synchronized with the mechanical motion under investigation, and in this manner make the mechanical motion appear to stand still. It is of course necessary that the principal light incident upon the mechanical device be supplied by the stroboscope, since too much light present in the interval between light flashes will destroy the illusion of the mechanism standing still.

One of the disadvantages of conventional stroboscopes is that the frequency of the light flash must be adjusted to the frequency of the mechanical mechanism under investigation, and hence changes in the frequency of the mechanical mechanism will require readjustment of the frequency of the stroboscope. Further, if the frequency of the mechanical motion under study tends to drift, the point during the cycle of the mechanical motion when the flash occurs will change, either making it impossible to study the motion, or changing the point in the mechanical cycle being observed. It is therefore an object of the present invention to provide a stroboscope in which the frequency of the light flash is directly keyed to the frequency of the mechanical motion under study.

It is obvious that keying the frequency of the light flash of a stroboscope to a mechanical motion being investigated will result in the light flash occurring at the same point in each cycle of the mechanical motion, and hence the mechanical motion will appear to stand still for observation purposes only in one particular position. This is clearly undesirable. It is therefore a further object of the present invention to provide a stroboscope in which the frequency of the light flash is keyed to the frequency of the mechanical motion under investigation in which the point in the cycle of the mechanical motion at which the light flash occurs is adjustable throughout the entire cycle of the mechanical motion.

The inventor has found that the objects stated above can best be accomplished by directly keying the stroboscope to the mechanical motion under investigation and providing an adjustable means for delaying the light flash. In this manner, the light flash may be adjusted to occur in any portion of the cycle of the mechanical motion by selecting the proper time delay between the point of the mechanical cycle used to key the stroboscope and the light flash itself. It is therefore a further object of the present invention to provide a stroboscope with means to delay the light flash from the time the light flash is triggered.

Unfortunately, not all mechanical motions may be used to directly key the light flash frequency. In applications where this is not possible, the inventor has found that an adjustable delay device disposed between the light producing means and a variable frequency triggering device, such as a strobotac, can be utilized to select the part of the mechanical cycle in which the light flash is to occur.

In addition to the advantages of the combination of a stroboscope and an adjustable time delay means set forth above, it is to be noted that non-periodic mechanical motions may also be investigated by this device. Conventional stroboscopes are unable to investigate mechanical motions which are not repetitive, or mechanical motions which operate at frequencies of less than approximately 5 cycles per second. The inventor has found that a stroboscope having a variable time delay means may be actuated at the beginning of a non-repetitive cycle, and photographic means employed to record the position of the mechanical motion at the point in its cycle in which the light flash occurs. Since the variable time delay means may be used to select any point in the cycle in which the light flash occurs, a series of photographic recordings can be used to trace out the entire cycle. It is therefore a further object of the present invention to provide a stroboscope suitable for investigating non-repetitive mechanical cycles, and mechanical cycles repeating at very low frequencies.

Other and further objects of the present invention will become readily apparent to the man skilled in the art from a further reading of the present disclosure, particularly when viewed in the light of the drawing which is a single figure showing a schematic circuit diagram of a stroboscope constructed according to the teachings of the present invention.

The figure illustrates the invention with the stroboscope provided with an electrical adjustable time delay, although it is to be understood that a mechanical time delay could also be used. The stroboscope illustrated in the figure comprises a pulse shaping amplifier 10, a time delay device 12, a pulse amplifier 14, and a flash producing device 16. The stroboscope is powered by a power supply 18.

The time delay device 12, illustrated in the figure, uses a phanastron delay circuit. However, it is to be understood that other electronic circuits could be substituted for the phanastron circuit in the stroboscope, for example, a monostable multi-vibrator. The phanastron circuit illustrated in the figure, however, has particular advantages in the stroboscope because of its stability and the linearity of its time delay calibration.

The time delay device 12 utilizes two vacuum tubes 20 and 22. Vacuum tube 22 is a dual triode tube, and one of the triodes 24 has its plate 26 and grid 28 interconnected to permit it to be used as a diode.

The other vacuum tube 20 has a plate 30, suppressor grid 32, screen grid 34, control grid 36, and plate return electrode in the form of a cathode 38. The plate 30 of vacuum tube 20 is connected to the positive terminal of the power supply 18, designated 40, through a plate resistor 42, and to the interconnected plate 26 and grid 28 of triode 24. The cathode 38 of vacuum tube 20 is connected to the negative terminal, designated 44, of the power supply 18 through a cathode resistor 46. The screen grid 34 of vacuum tube 20 is connected to the positive terminal 40 of the power supply 18 through a resistor 48 and to the negative terminal 44 through a resistor 50 to provide the screen grid 34 with a positive potential. The suppressor grid 32 is also connected to the positive terminal 40 through a resistor 52 and to the negative terminal 44 of the power supply 18 through a resistor 54. The control grid 36 of vacuum tube 20 is connected to the positive terminal 40 of the power supply 18 through a resistor 56 and a variable resistor 58 connected in series.

The second triode 60 of vacuum tube 22 is connected as a cathode follower, the plate 62 of this triode 60 being directly connected to the positive terminal 40 of the power supply 18. The grid 64 of the triode 60 is connected to the interconnected plate 26 and grid 28 of the triode 24, and the cathode 66 is connected to the negative terminal 44 of the power supply through a cathode resistor 68. The plate return electrode, or cathode 66, of triode 60 is also coupled to the control grid 36 of vacuum tube 20 through a multiple position double pole switch 70. Each pair of poles of the switch 70 are connected to capacitors 72A, 72B . . . 72n, and provide the desired range of time delays, the number of capacitors, n, depending upon the number of time delay ranges desired, two being illustrated. The cathode 74 of triode 24 is connected to the positive terminal 40 of the power supply 18 through a resistor 100 connected to the tap of a variable resistor 102. One end of the resistor 102 is connected to the positive terminal 40 of the power supply 18, and the other end of the resistor 102 is connected to the negative terminal 44 of the power supply 18 through a variable resistor 104.

In a particular construction of the stroboscope to be described throughout this disclosure, vacuum tube 20 is a type 6BE6, vacuum tube 22 is a type 12AU7, resistor 48 is 1,000,000 ohms, resistor 50 is 47,000 ohms, resistor 52 is 15,000 ohms, resistor 54 is 4,700 ohms, resistor 56 is 1,000,000 ohms, resistor 58 is a 1,000,000 ohm potentiometer, resistor 42 is 4,700,000 ohms, resistor 46 is 10,000 ohms, resistor 68 is 47,000 ohms, condenser 72A is 0.03 microfarads, condenser 72B is 0.1 microfarads, resistor 102 is 25,000 ohms, resistor 104 is 10,000 ohms, resistor 100 is 47,000 ohms, condenser 122 is 1,000 micro-microfarads, and the potential difference between terminals 40 and 44 of the power supply 18 is 255 volts.

The signal which initiates the time delay is in the form of a negative pulse and is coupled to the plate return electrode in the form of a cathode 74 of triode 24 through a condenser 76. Since it is generally most convenient to utilize a positive pulse of somewhat irregular wave shape to initiate the time delay, the wave shaping amplifier 10 is disposed between the cathode 74 of triode 24 and the input terminals 78 of the stroboscope. The amplifier 10 utilizes one triode 80 of a dual triode vacuum tube 82. The plate 84 of the triode 80 is connected to the positive terminal 40 of the power supply 18 through a plate resistor 86 and to the condenser 76, thus coupling the plate 84 to the time delay device 12. The triode 80 has a grid 88 which is connected to the tap of a tapped variable resistor 90. The variable resistor 90 is connected to the input terminals 78 through a condenser 92. The plate return electrode or cathode 94 of triode 80 is connected to the negative terminal 44 of the power supply 18 through a resistor 96 connected in parallel with a condenser 98, and one end of the variable resistor 90 is also connected to the negative terminal 44 of the power supply 18.

In the particular construction of the stroboscope, the triode 80 is one section of a type 12AX7 vacuum tube, the plate resistor 86 is 220,000 ohms, the cathode resistor 96 is 100,000 ohms, the by-pass condenser 98 is 0.01 microfarad, the variable resistor 90 is 500,000 ohms, the condenser 92 is 0.01 microfarad, and the condenser 76 is 500 micromicrofarads.

The other triode 106 of vacuum tube 82 is utilized in the amplifier 14. Triode 106 has a plate 108 connected to the positive terminal 40 of the power supply 18 through a plate resistor 110. The plate return electrode in the form of cathode 112 of triode 106 is connected to the negative terminal 44 of the power supply 18 through a resistor 114 connected in parallel with a condenser 116. The grid 118 of triode 106 is connected to the negative terminal 44 of the power supply 18 through a resistor 120. The grid 118 is also coupled to the cathode 66 of triode 60 of the time delay circuit 12 through a condenser 122.

In the particular construction of this stroboscope, resistor 110 is 220,000 ohms, condenser 116 is 0.01 microfarad, resistor 120 is 220,000 ohms, and resistor 114 is 100,000 ohms.

The flash producing device 16 uses a cold cathode flash tube 124 having a control grid 126 coupled to the plate 108 of triode 106 in the amplifier 14 through a condenser 128. The grid 126 is also connected to the negative terminal 44 of the power supply 18 through a resistor 130. The power supply 18 is also provided with a positive terminal 132 of higher potential than the terminal 40, and the plate 134 of flash tube 124 is connected to this terminal 132 through a resistor 136. The plate 134 is also connected to the negative terminal 44 of the power supply 18 through a condenser 138. The flash tube 124 has a shield grid 140 which is connected to the positive terminal 40 of the power supply 18 through a resistor 142, and to the negative terminal 44 of the power supply 18 through a resistor 144. The flash tube 124 has a cathode 146 which is connected to the negative terminal 44 of the power supply 18.

In the particular construction here described, the flash tube 124 is a type SN4 tube, resistor 130 is 1,000,000 ohms, condenser 128 is 500 micro-microfarads, resistor 142 is 51,000 ohms, resistor 144 is 15,000 ohms, resistor 136 is 3,000 ohms, and condenser 138 is 2.0 microfarads.

The power supply 18 is of conventional design and converts the 115 volts A. C. generally available from the power lines to direct current. A potential of plus 255 volts exists between terminals 40 and 44 and a potential of plus 300 volts exists between terminals 132 and 44. Since the power supply 18 is of conventional design, it will not be further described.

It is generally most convenient to key the light flashes of the stroboscope to the mechanism under investigation by attaching switch contacts to the mechanical mechanism where this is possible. For this reason, a pair of switch contacts 148 have been shown in a dotted circuit with a battery 150 connected between the terminals 78 of the stroboscope. It is of course to be understood that the stroboscope may be operated without mechanically coupling switch contacts to the mechanism to be studied, as set forth above. However, if switch contacts 148 are so used, they will be closed at a particular point in each cycle of the mechanism under investigation, thus producing a positive pulse at this point in each cycle. The positive pulse is then amplified by the pulse shaped amplifier 10 and transformed to a negative pulse with a sharp leading edge. This pulse is impressed upon the cathode 74 of triode 24, and the leading edge of the pulse determines the beginning time, which we may designate $t_0$. In the absence of a pulse, the plate 30 of vacuum tube 20 is maintained at a voltage less than the positive supply voltage, since the current through the triode 24 of vacuum tube 22 is flowing through the plate dropping resistor 42. Triode 24 is operating as a diode clamp. Under these conditions no plate current flows in vacuum tube 20, all of the cathode current passing through the screen grid 34. Under these conditions, the cathode 38 and control grid 36 are provided with a bias of approximately 30 volts positive, while the suppressor grid 32 is maintained at a positive potential of approximately 10 volts, the screen grid 34 having a potential of approximately 70 volts positive. It is to be noted that all potentials referred to herein are measured relative to the negative terminal 44 of the power source 18.

At the time $t_0$ when the negative pulse from the amplifier 10 is applied to the cathode 74 of the diode connected triode 24, the plate 26 of the triode 24 and the plate 30 of tube 20 follow the cathode 74 negatively. Triode 60 is connected as a cathode follower between the plate 30 of vacuum tube 20 and the control grid 36 of vacuum tube 20, and thus transmits the negative voltage swing from the plate 30 of vacuum tube 20 to the control grid 36 thereof through one of the condensers 72A or 72B connected to the terminals of switch 70. As a result, the screen current through vacuum tube 20 diminishes and the cathode 38 becomes more negative until the potential of the cathode 38 approaches the potential of the suppressor grid 32. At this point, the suppressor grid 32 no longer has sufficient bias to cut off plate current in vacuum tube 20, so some of the cathode current is allowed to flow in the plate circuit. As a result, the potential of the plate 30 continues to fall even after the initiating pulse has disappeared.

However, the control grid 36 soon reaches a potential lower than the cathode 38, and the total cathode current is cut down to a point at which the voltage drop across resistor 42 is insufficient for further rapid potential fall. The control grid 36 is thus stabilized at this point and the only movement of the potential of plate 30 is then a slow linear fall required to hold the control grid 36 at an essentially constant potential relative to the cathode by overcoming the discharging effect of resistors 56 and 58.

The slow linear fall in the potential of plate 30 continues as the voltage drop from the plate 30 to the cathode 38 decreases until the tube 20 saturates. At this time, which we may call $t_t$ the plate 30 stops its negative excursion and therefore no longer keeps the potential of grid 36 constant relative to cathode 38. The current flowing through resistors 56 and 58 then raise the potential of the control grid 36 increasing the current through vacuum tube 20 and also the positive bias upon cathode 38. The plate current is thus decreased and the potential of plate 30 becomes more positive until the initial conditions are again assumed. The time delay between $t_0$ and $t_t$ may be adjusted by selection of the positive potential applied to the cathode 74 of the diode connected triode 24. This is accomplished by the variable resistor 102. The switch 70 selects the capacitor for transmitting the pulse to the grid 36, and thus determines the range of time delays which can be made by adjustment of resistor 102. The length of time the plate circuit of vacuum tube 20 can hold the control grid 36 at a constant potential is dependent upon how long it takes the plate 30 to reach saturation potential. The saturation potential of the tube 20 is constant, so that the farther the plate 30 must drop in potential to reach this saturation potential, the longer will be the delay from time $t_0$ to $t_t$.

The cathode follower including triode 60 causes the plate 30 of vacuum tube 20 to rise sharply at time $t_t$ and provides a short recovery time for the circuit. The cathode 66 of triode 60 experiences a sharp rise in potential at time $t_t$, and this is used to drive the grid 118 of the amplifier 110.

The amplifier 14 differentiates the pulse appearing upon the cathode 66 of triode 60 and produces a negative pulse of larger amplitude and relatively short time duration. This negative pulse is transmitted to the flash tube 124 and produces the flash of light. The shield grid 140 of the flash tube 124 prevents the high positive potential of the plate 134 from causing an electrostatic field at the cathode 146 sufficiently strong to fire the tube 124. The pulse delivered to the grid 126 of vacuum tube 124 produces ionization within the tube 124 which discharges the condenser 138 and produces the light flash. Since the condenser 138 discharges rapidly, the light flash is of short duration.

The man skilled in the art will readily devise many modifications and improvements of the stroboscope described herein. It is therefore intended that the scope of the present invention be not limited by the foregoing disclosure, but rather only by the appended claims.

The inventor claims the following as his invention:

1. A device for investigating mechanical motions comprising means to generate an electrical pulse at a given point of each cycle of the mechanical motion under study, a flash circuit having a flash tube electrically connected to the pulse generating means for producing a light flash responsive to each pulse of the pulse generating means, and means to delay the pulse generated by the generating means for a period of time comprising a first vacuum tube having a plate, screen grid, control grid, and plate return electrode, a source of power having a positive terminal connected to the plate of the vacuum tube through a plate resistor and a negative terminal connected to the plate return electrode of the tube through a resistor, the screen grid of said tube being electrically connected to the positive terminal of the source of power through a potential dropping means, current by-passing means electrically connected between the plate and the negative terminal of the power source, said means also being electrically connected to the means for generating electric pulses and the magnitude of the current flowing through said circuit being diminished by a pulse from the pulse generating means and by a decrease in the potential between the plate of the vacuum tube and the negative terminal of the power source, a condenser electrically connected between the plate and control grid of the tube, and a resistor electrically connected between the grid and positive terminal of the power source.

2. A device for investigating mechanical motions comprising the elements of claim 1 wherein the current by-passing means electrically connected between the plate and the negative terminal of the power source comprises a second vacuum tube having a plate electrically connected to the plate of the first vacuum tube and a plate return electrode electrically connected to the means for generating pulses and to the negative terminal of the power source through an impedance.

3. A device for investigating mechanical motions comprising means to generate an electrical pulse at a given point of each cycle of the mechanical motion under study, a flash circuit electrically connected to the pulse generating means having a flash tube for producing a pulse of light for each cycle of the mechanical motion, means to delay the pulse generated by the pulse generating means for a period of time electrically connected between the pulse generating means and the flash circuit comprising a first vacuum tube having a plate, screen grid, control grid and plate return electrode, a source of power having a positive terminal connected to the plate of the vacuum tube through a plate resistor and a negative terminal connected to the plate return electrode of the tube through a second resistor, the screen grid of said tube being electrically connected to the positive terminal of the source of power through a resistor, a second vacuum tube having a plate electrically connected to the plate of the first vacuum tube and a plate return electrode electrically connected to the negative terminal of the power source through a resistor, the plate return electrode of said second tube being electrically connected to the pulse generating means, a third vacuum tube having a plate, control grid, and plate return electrode connected in a cathode follower circuit, the plate being electrically connected to the positive terminal of the power source, the grid being directly connected to the plate of the first vacuum tube, and the plate return electrode being electrically connected to the control grid of the first vacuum tube through a condenser, said plate return electrode also being connected to the negative terminal of the power source through a resistor and to the flash circuit.

4. A device for investigating mechanical motions comprising the elements of claim 3 in combination with adjustable means for varying the positive potential of the plate return electrode of the second vacuum tube, thereby varying the period of time delay.

5. A device for investigating mechanical motions comprising the elements of claim 3 in combination with an amplifier disposed between the pulse generating means and the plate return electrode of the second vacuum tube of the means to delay a pulse, said amplifier producing a negative pulse with a steep wave front.

6. An electrical circuit for generating delay pulses comprising a first vacuum tube having a plate, screen grid, control grid, and plate return electrode, a source of power having a positive terminal connected to the plate of the vacuum tube through a plate resistor and a negative terminal connected to the plate return electrode of the vacuum tube through a second resistor, the screen grid of said tube being electrically connected to the positive terminal of the source of power through potential dropping means, current by-passing means electrically connected between the plate of the vacuum tube and the negative terminal of the power source, said current by-passing means also being electrically connected to the means for generating electric pulses and the magnitude of the current flowing through said circuit being diminished by a pulse from the pulse generating means and by a decrease in the potential between the plate and negative terminal of the power source, a cathode follower electrically connected between the plate of said tube and the control grid thereof, said cathode follower having a second vacuum tube with plate connected to the positive terminal of the power source, a control grid connected to the plate of the first vacuum tube, and a plate return electrode connected to the negative terminal of the power source through an impedance and to the control grid of the first vacuum tube through a condenser.

7. A pulse delay circuit comprising the elements of claim 6 wherein the current by-passing means connected between the plate of the first vacuum tube and the negative terminal of the power source comprises a vacuum tube having a plate and plate return electrode, the plate being electrically connected to the plate of the first vacuum tube and the plate return electrode being electrically connected to the negative terminal of the power source through a resistor.

8. A pulse delay circuit comprising the elements of claim 7 wherein the plate return electrode is connected to the negative terminal of the power source through a variable impedance.

References Cited in the file of this patent

UNITED STATES PATENTS

| | | |
|---|---|---|
| 2,201,166 | Germeshausen | May 21, 1940 |
| 2,331,317 | Germeshausen | Oct. 12, 1943 |
| 2,478,907 | Edgerton | Aug. 16, 1949 |
| 2,538,577 | McCarty | Jan. 16, 1951 |